Patented Sept. 27, 1949

2,482,832

UNITED STATES PATENT OFFICE 2,482,832

PREPARATION OF TYROTHRICIN

Abraham Louis Baron, New York, N. Y., assignor to S. B. Penick & Company, New York, N. Y., a corporation of New York No Drawing. Application November 21, 1945, Serial No. 630,130

4 Claims. (Cl. 195—96)

My invention relates to the production of the drug known as "tyrothricin" and has for its general object an improvement in the present method of producing the same. A further object is to increase the yield of the drug obtainable by the present method of production.

In the production of that drug by fermentation with *Bacillus brevis* of liquors containing, in addition to the usual nutrient mineral salts and glucose, an amino acid or a salt thereof, I have found that by constantly stirring the liquor these bacteria can be grown and the fermentation conducted to produce appreciable yields of the drug, in a deep tank or column of the liquor as distinguished from the customary practice of using shallow pans for this purpose. I have also found that by the addition of urea or a derivative thereof to the fermentation liquor the yield of the drug per liter of liquor can be substantially increased and that the drug is easily isolated from the liquor and may be readily recovered therefrom.

The advantages of deep tank fermentation, such as lower installation and production costs, greater yields per unit of capacity etc. etc., are too well known in the art of fermentation to need reciting here; and the additional advantages gained by the addition of urea or one or more of its derivatives to the fermentation liquor are due to the fact that their presence not only increases the yield of the drug but acts to prevent undesirable contamination of the yield.

The formula I prefer to use for the nutrient mineral salts solution (which is not substantially different from that customarily used in such cases) is set forth in the following recipe:

| | |
|---|---|
| $K_2HPO_4$ | grams 5.0 |
| $KH_2PO_4$ | do 5.0 |
| $MgSO_4.7H_2O$ | do 2.0 |
| NaCl | do 0.1 |
| $MnSO_4.2H_2O$ | do 0.1 |
| $FeSO_4.7H_2O$ | do 0.1 |
| $Ca(H_2PO_4).H_2O$ sat. sol | c.c. 20 |
| $H_2O$ q. s | liter 1 |
| pH adjusted with KOH | 7.0 |

In the practice of my process, I first allow a strain of *Bacillus brevis* to grow in the aforesaid salts solution (to which is added a small quantity of a compound containing assimilable nitrogen as, for example, 10 gms. of casein) for about twenty-four hours with the solution kept at about 37° C. For this purpose, a test tube containing about 5 c.c. of said solution is adequate. Since this solution will not sustain the growth of these bacteria sufficiently for any substantial production of the drug, I use the 24 hour old culture so prepared to inoculate the fermentation liquor or medium employed for the production of the drug and which, for example, I may prepare as follows:

*Example I.*—200 c.c. of the aforesaid salts solution are measured out and diluted to 1960 c.c. with tap water. To this is added 10 gms. (that is about 0.5%) of sodium glutamate, and the solution then transferred to a 3 liter fermentation pot and sterilized for 15 minutes in an autoclave at 15 lbs. steam pressure. At the end of sterilization, it is set aside to cool. Meanwhile, 20 gms. of glucose dissolved in 40 c.c. of aqueous solution is placed in a small flask and likewise sterilized for 15 minutes at 15 lbs. steam pressure. After cooling, the contents of the flask are poured aseptically into the fermentation pot. The 5 c.c. of the 24 hour old culture is now poured aseptically into the fermentation pot. The now inoculated fermenter is set into a water bath thermostatically controlled at 37° C., a stirrer, which may be operated by a motor adjusted to approximately 1000 R. P. M. by means of a variable transformer, is introduced into the pot and the fermentation allowed to proceed for 36 hours with constant stirring. Then the pH is adjusted to 4.7 by the addition of hydrochloric acid. After remaining (without further stirring) for about 24 hours the acidified fermented liquor is filtered and the filtrate discarded. The precipitate is extracted three times with 200 c.c. of methyl alcohol, filtered and the washed filter cake discarded. The extracts are combined and the alcohol removed by distillation. The aqueous residue is filtered and the filtrate discarded. The precipitate drug—crude tyrothricin—is dried overnight in a dessicator containing phosphorous pentoxide, washed twice with 20 c.c. portions of ether, and again dried overnight in the desiccator. The dried product should average about 85 mgs. per liter of fermentation liquor.

*Example II.*—By adding 0.1% of urea to a fermentation pot containing the same amount of the fermentation liquor as in Example I and inoculating the liquor as before with 5 c.c. of a 24 hour culture of the bacteria and proceeding as described above, the yield of the crude drug will be almost double that of Example I, averaging about 150 mgs. per liter of the fermentation liquor.

*Example III.*—If in place of the urea in Example II, about 0.1% of thiourea be added to the fermentation pot, the yield of the drug will be still greater, averaging, as I have found with some strains of the bacteria, as much as 412 mgs. per liter.

In addition to urea and thiourea, the derivatives of urea which will produce this remarkable effect include alkylureas, alkylthioureas, arylalkylthioureas, arylthioureas, and ring-substituted arylthioureas, thiosemicarbazide, thiobiuret, and the like. With respect to the use of urea and its derivatives in my process, each is most efficient within certain respective ranges of concentration since, outside those ranges, they assist much less in promoting the growth of these bacteria. For urea, for example, the most effective range is in concentrations of from 0.1% to 2.0% in the fermentation liquor; and for thiourea, the concentration should be from 0.01% to 0.5%.

In respect of the use of amino acids in my process, I prefer to use dibasic amino acids; and only a single mono or dibasic amino acid or salt thereof should be used in making up any batch of fermentation liquor. On the whole, I regard glutamic acid or the sodium or potassium salt thereof as preferable to any other amino acid or its salt for use in my process. Hydrolized casein or gelatin, for example, would not satisfy since neither is the equivalent in my process of a single amino acid or a single salt of such acid.

I claim as my invention:

1. In the production of tyrothricin by deep tank fermentation, the process of fermenting with *Bacillus brevis* a liquor containing mineral salts, glucose, a single amino acid, and a thiourea compound.

2. In the production of tyrothricin by deep tank fermentation, the process of fermenting with *Bacillus brevis* a liquor containing mineral salts, glucose, sodium glutamate, and from 0.01% to 0.5% of thiourea.

3. In the production of tyrothricin by deep tank fermentation, the process of fermenting with *Bacillus brevis* a liquor containing mineral salts, glucose, 0.5% of sodium glutamate, and from 0.01% to 0.5% of thiourea.

4. The process of producing tyrothricin by deep tank fermentation, which comprises fermenting with *Bacillus brevis* for approximately 36 hours with constant stirring a liquor containing mineral salts, glucose thiourea and sodium glutamate, then adjusting the pH of the liquor to about 4.7 and allowing the liquor to remain still for approximately 24 hours, and finally extracting the tyrothricin therefrom.

ABRAHAM LOUIS BARON.

REFERENCES CITED

The following references are of record in the file of this patent:

UNITED STATES PATENTS

| Number | Name | Date |
| --- | --- | --- |
| 2,406,174 | Stokes | Aug. 20, 1946 |

OTHER REFERENCES

Dubos, Jr. Pediatrics 19, 1941, pp. 588 to 595.

Stokes et al., Jr. Bact. 46, 1, July 1943, pp. 83 to 88.

Humfeld et al., Proc. Soc. Exptl. Biol. and Medicine, November 1943, page 234.